United States Patent [19]
Shanks

[11] Patent Number: 5,764,411
[45] Date of Patent: Jun. 9, 1998

[54] APPARATUS FOR DISPLAYING AN IMAGE

[75] Inventor: Ian Alexander Shanks, Penn, England

[73] Assignee: Thorn EMI plc, London, England

[21] Appl. No.: 103,165

[22] Filed: Aug. 9, 1993

Related U.S. Application Data

[63] Continuation of Ser. No. 711,993, Jun. 7, 1991, abandoned.

[30] Foreign Application Priority Data

Jun. 7, 1990 [GB] United Kingdom .................. 9012667

[51] Int. Cl.$^6$ .............................. G02B 5/30; G02B 5/124; G02B 27/22; G02B 27/28
[52] U.S. Cl. .............. 359/483; 359/487; 359/490; 359/492; 359/530
[58] Field of Search ........................ 359/483, 490, 359/494, 495, 496, 497, 529, 530, 546, 459, 465, 462, 37, 491, 492; 358/88

[56] References Cited

U.S. PATENT DOCUMENTS

| | | |
|---|---|---|
| 4,073,569 | 2/1978 | Rizzo . |
| 4,550,978 | 11/1985 | Friedle . |
| 4,702,603 | 10/1987 | Augustyn ................... 359/487 |
| 4,859,031 | 8/1989 | Berman et al. . |
| 5,036,512 | 7/1991 | Cloonan et al. ................ 359/122 |
| 5,050,966 | 9/1991 | Berman . |

FOREIGN PATENT DOCUMENTS

| | | |
|---|---|---|
| 1321303 | 6/1973 | United Kingdom ............... 359/495 |
| 1543616 | 4/1979 | United Kingdom . |
| 2177842 | 1/1987 | United Kingdom . |
| 83/03019 | 9/1983 | WIPO . |
| 90/05944 | 5/1990 | WIPO . |

*Primary Examiner*—Ricky D. Shafer
*Attorney, Agent, or Firm*—Keck, Mahin & Cate

[57] ABSTRACT

An imaging system for the generation of an apparent three-dimensional (3-D) image suspended in space for direct veiwing includes a beamsplitter and a retroreflector. The optical property of reflecting light back along its original path enable the system to generate such an apparent 3-D image based on the perception of depth cues present in the original scene for viewing.

2 Claims, 5 Drawing Sheets

APPARATUS FOR DISPLAYING AN IMAGE

This is a continuation of application Ser. No. 07/711,993, filed Jun. 7, 1991 now abandoned.

The present invention relates to apparatus for displaying an image and has particular, though not exclusive, relevance to apparatus for displaying a television screen image.

Methods of image display in order to produce stereoscopic or apparent three dimensional (3-D) displays are well known.

One method generally requires the use of visual aids to separate stereoscopically disparate channels so that each image reaches appropriate eyes of a viewer. Such a method is described in U.K. Patent Application number GB 1523436 A. This disloses a system displaying two slightly differing images framed sequentially onto a single cathode ray tube. The images are formed in conjunction with a liquid crystal polarization switch and viewed with polarising spectacles.

However, not only can the use of visual aids such as the above mentioned spectacles be uncomfortable for the viewer, but the requirement for disparate images to be viewed by the appropriate eyes means that this type of method is not compatible with existing photographic or television images, and the like which are all based on the provision of a single two-dimensional (2-D) picture. This latter restriction also applies to the various known methods of producing stereoscopic or panoramic 3-D dimensional images using slit masks or lenticular screens and also to so called "cubic" 3-D image displays which cause light to be emitted from various points within a 'cubic' volume, for example, by reflecting a cathode ray tube in a vibrating mirror so that its image moves to describe the volume. None of the above methods is therefore retro-compatible with existing practices of television and photography which conventionally produce a flat, 2-D image.

One other imaging method tends to use large lenses or mirrors to form real or virtual images of a single picture. This technique is known as "vue d'optique", a term well known in this art. One example of such a technique is described in U.K. Patent number GB 2062281 B. In this Patent is described the use of a large tilted Fresnel lens to form a real image of a single picture on a bell-shaped or saddle-shaped imaging surface. The formed image is distorted due to its formation on a tilted or curved surface, and the angle through which the image may be viewed is limited due to the finite numerical aperture of the mirror or lens, and to parallax between the image created and the edges of the mirror or lens.

It is an object of the present invention to provide apparatus to produce a real image suspended in space for direct viewing and derived from an original image such as a two dimensional scene, or from an object, for perception as three dimensional. This is achieved by reducing the depth cues present in the original image which contribute to its perception as being flat or two dimensional, for example, stereoscopic binocular disparity, convergence, accommodation and motion parallax.

It is a further object of the present invention to provide a method of producing a real image in space, derived from an object or original image such as a two dimensional scene, for perception as three dimensional.

According to a first aspect of the present invention there is provided apparatus for displaying an apparent three dimensional image of an object or original image, the apparatus comprising; at least one array of retroreflectors and at least one beamsplitter; arranged to produce from the object or original image, a real image suspended in space for viewing as the apparent three dimensional image.

Thus a real image in space is formed without the use of large and expensive lenses or curved mirrors with their associated distortions and aberrations, without the same degree of limitation on the viewing angles imposed in practice by the numerical apertures of such lenses or curved mirrors and without the need for a projection screen to scatter or diffuse the real image in order to make it visible.

Preferably, the retroreflector is in the form of an array of corner-cubes formed as protrusions or depressions on a major surface of a sheet of suitable material, such as a plastics material.

Corner-cubes formed as protrusions on the surface of a transparent material may optionally be coated with a reflective metal, such as aluminium. This allows for enhanced resolution of the image suspended in space.

Alternatively, an arrangement with the corner-cubes formed as protrusions on the surface of a transparent material may simply make use of total internal reflection within the solid transparent material.

If the corner-cubes are formed as depressions on the surface of the sheet, they should be made reflective by coating with a reflective metal such as aluminium. This construction has the advantage that undesirable specular reflections from the front surface of the sheet are avoided and that any beam spreading of a retroflected ray, due to manufacturing tolerances in making the corner-cube array, is not exaggerated by refraction when emerging from the transparent material.

Alternatively, the array of retroreflectors may be in the form of a sheet of the glass bead type and may include such beads as have a graded index of refraction such as are present in Luneberg lenses. By the use of small diameter glass bead retroreflectors, retroreflective properties for a large range of angles of incidence, down to almost grazing incidence, are possible, and because this allows for a very large numerical aperture, large viewing angles are available.

By the use of retroreflectors within the apparatus to create the real image suspended in space, the flatness cues in the original image are sufficiently weakened that perception of the depth cues recorded pictorially in the real image dominates and 3-D perception is achieved. Solid objects may also pass through the real image without hindrance.

Preferably, the beam splitter is a partially transparent semi-reflective mirror. This allows the image of the original scene to be split into two channels, each of which may be retroreflected then recombined to produce the real image in space.

Thus the invention also provides for the formation of an apparent three dimensional real image suspended in space from a conventional television receiver without the need for any adjustment or modification of the image displayed on the television screen except, possibly, for increasing its brightness. Furthermore, any suitable two dimensional scene may be employed such as video or computer-generated image.

According to a second aspect of the present invention there is provided a method for displaying an apparent three dimensional image of an object or original object or image, the method comprising; projecting light beams from the original image via at least one beam splitter so as to strike at least one retroreflector array and reforming retroreflected light beams thereby to produce a real image suspended in space for viewing as the apparent three dimensional image.

The invention will now be described, by way of example only, with reference to the accompanying drawings of which:

The invention is based on the perception of depth by humans based on the assimilation of depth cues perceived in the original scene.

Many depth cues exist, only two of which—stereodisparity and convergence—fundamentally require the use of both eyes. All the other depth cues—and they are well known to those skilled in the art—can be perceived with one eye only. Thus many of these other depth cues are able to be captured by a video camera or on a photograph or the like and many can be generated by a computer or artist and displayed in a photograph, painting or the like.

Examples of such pictorial depth cues are: perspective, foreshortening, interposition, accommodation, motion parallax, and kinetic interposition. Those skilled in the art will appreciate that many more depth cues exist, and the above are given by way of example only.

Since some or many of these pictorial depth cues are inherent within any representation or picture of a scene, in principle they can be used in order to create a perception of depth within that picture. However, humans perceive, for example, a television screen image as being flat or two dimensional because either there are too many flatness cues, (for example, stereoscopic disparity, convergence, accommodation and framing effects) present in the image or that the number and strength of depth cues is too small. The apparatus of the present invention tends to weaken flatness cues sufficiently for the human eye/brain combination to utilise the pictorial depth cues and to perceive depth within the image formed. This weakening of the flatness cues derives from a number of contributory factors, for example, the absence of reflections or scattering from the real image as it is suspended in space, its detachment from any surrounding frame and its unusual occurrence suspended in front of the retroreflectors or superimposed on the real world beyond. This is achieved by the use of retroreflectors.

Figure 1:
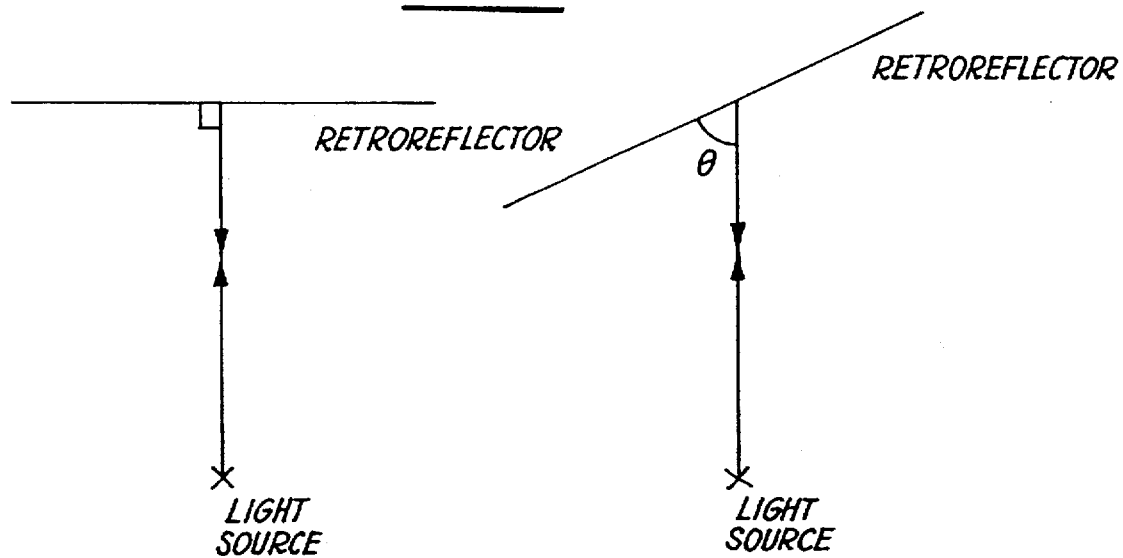
FIG. 1 illustrates, in schematic form, the optical property of a retroreflector utilised in the present invention and, FIG. 2 shows schematically an optical arrangement of the present invention, and, FIG. 3 shows schematically a further arrangement of the present invention.

The principles of retroreflectors are shown diagrammatically in FIG. 1. It can be seen that light incident upon a retroreflector is substantially reflected back along its original path, whatever the angle of incidence (with limits defined by the type of retroreflector employed).

Figure 2:
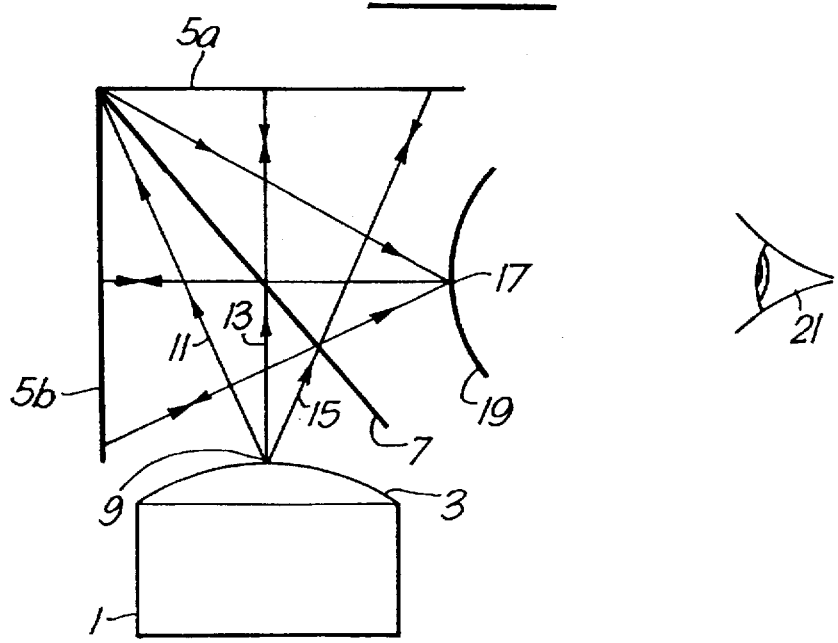

By referring now to FIG. 2, it will be seen that the present invention involves creating a real image suspended in space.

In this preferred embodiment, the apparatus includes a conventional television set 1 arranged to lie so that its screen 3 is in a horizontal plane. Directly above the screen 3 and also in a horizontal plane is positioned a retroreflector 5a. Orthogonal to this retroreflector 5a and in a vertical plane there is arranged a further retroreflector 5b.

The type of retroreflector chosen in this apparatus is of the corner-cube type such as is manufactured by the Reflexite Inc. company.

Positioned between and at 45° to both retroreflectors 5a, 5b, is a beam splitter in the form of a partially transparent semi-reflective mirror 7.

Considering now a pixel 9 on the screen 3. Light from the pixel 9 will be emitted in divergent rays and strike the semi-reflective mirror 7. In FIG. 2, three such rays only 11, 13 and 15 are shown for clarity. The light is then split by the semi-reflective mirror 7 wherein some light is reflected to retroreflector 5b and some light is transmitted to retroreflector 5a. Both retroreflectors 5a, 5b reflect the light rays impinging on them back along their respective original paths i.e. to the semi-reflective mirror 7. These light rays are once more split by the semi-reflective mirror 7, but because the rays have been retroreflected when diverging, they now become convergent and so combine or reform to come to a focus 17, and form a suspended real image of the pixel in space.

Whilst the example above refers to a single pixel 9, a television screen image is simply an array of such pixels, and as such a projected image of the whole television screen image may be viewed by an observer 21, the image of the television screen 3 appearing suspended in space at 19. Because many depth cues were present in the original image, they are also present in the real image suspended in space. However, because this real image is suspended in space, it has the appearance of viewing a scene through a window, and the flatness cues become weakened and allow the observer to use the image depth cues to create an effect of three dimensional viewing. Furthermore, by utilising retroreflective surfaces as opposed to the large mirrors or lenses described in the prior art, a large numerical aperture is obtained which allows a wide viewing angle, and the high costs of large lenses and curved mirrors and their associated aberrations and distortions are avoided. Retroreflective sheets are available commercially in large sizes and at modest cost. Their positioning and orientations are not critical matters, in strict contrast to the use of lenses or curved mirrors which may distort the image produced if they are not accurately aligned and oriented.

Figure 4:
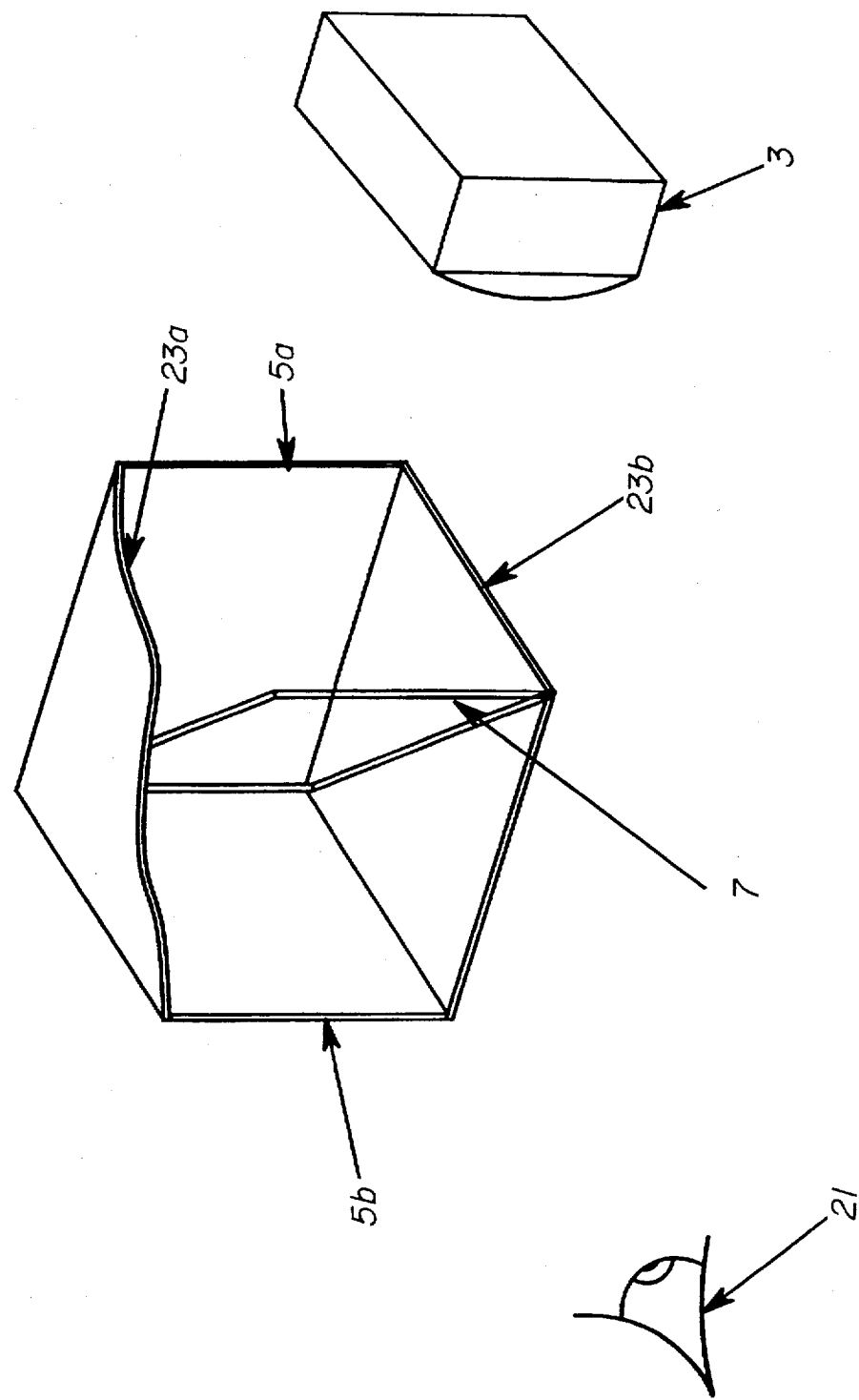
FIG. 4 illustrates an exploded view of yet a further arrangement of the present invention.

With reference now also to FIG. 4, it will be seen how an increased viewing angle is obtained. The apparatus of FIG. 4 is similar to that of FIG. 2, but with the inclusion of two plane mirrors 23a, 23b. The mirrors 23a, 23b, flank both retroreflectors 5a, 5b and the beamsplitter 7. The mirrors 23a, 23b are arranged such that they fit against both retroreflectors 5a, 5b and beamsplitter 7.

In FIG. 2, in order for an apparent 3-D image to be formed, each retroreflector 5a, 5b is necessarily in a direct optical line with the pixel 9 and beamsplitter 7, i.e. light from pixel 9 emitted at an elevated angle to the plane of the paper such that it passed through the beamsplitter 7 but did not strike either retroreflector 5a, 5b would not then form an apparent 3-D image.

The arrangement of FIG. 4 obviates this problem because light reflected from either mirror 23a, 23b which would otherwise not then contribute to forming the apparent 3-D image will now necessarily be reflected toward either the beamsplitter 7 or retroreflector 5a or 5d dependent upon whether the point at which the light strikes the mirror is before or after passing through beamsplitter 7.

It will be apparent that the mirrors 23a, 23b need not be orthogonal to each other but may be angled and still allow an increased viewing angle.

It will be apparent to those skilled in the art, by consideration of simple optical geometry that the mirrors 23a, 23b will also enable a greater viewing angle than the embodiment shown in FIG. 2 by the same principles as above.

Figure 3:
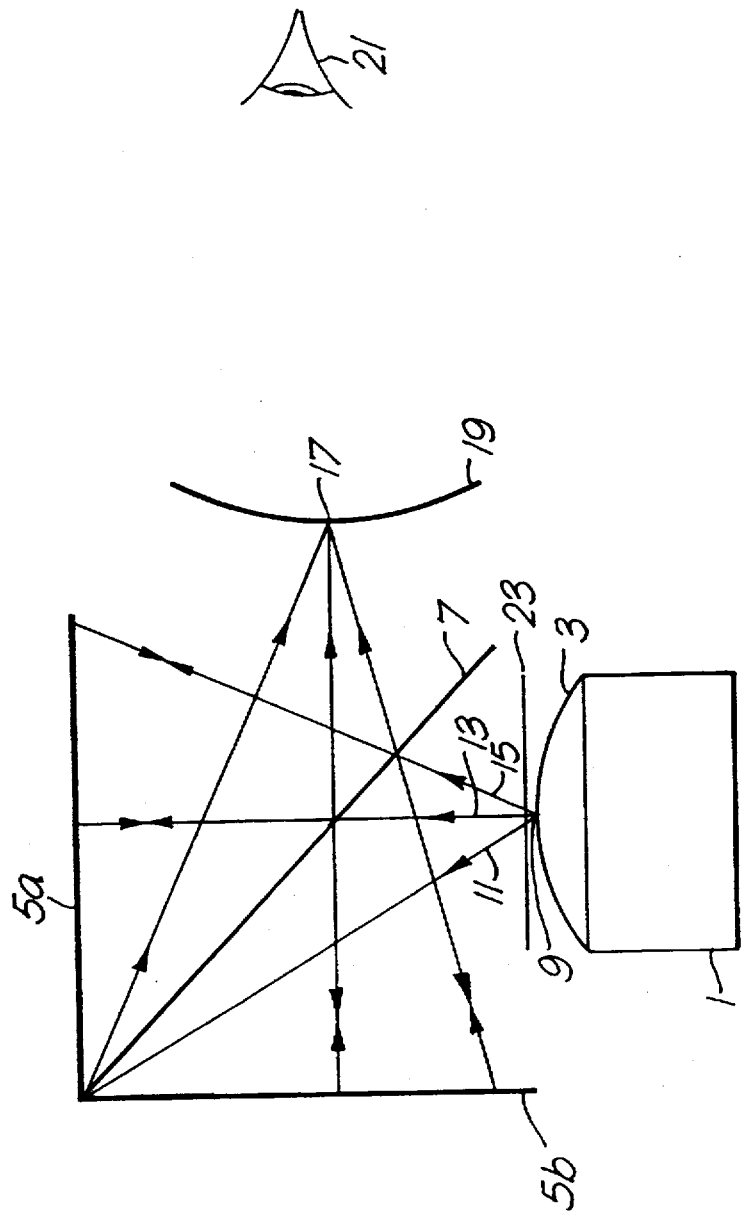

It has also been found that by shielding the television screen from the view of the observer 21 a more dramatic 3-D effect is observed for the real image suspended in space. By referring to FIG. 3, it may be seen that this is achieved by covering the screen 3 with a louvre-screen 23 or the like. This louvre screen allows light to pass through it but only over a limited range of angles. Thus near normal light may pass through to reach the retroreflectors and form the real image, whilst obliquely emitted light from the original image, namely the screen 3, is absorbed and the original image cannot be seen directly.

Whilst in the example given hereinbefore, two retroreflective surfaces have been used, it will be apparent to those skilled in the art that any number or arrangement of retroreflectors will enable the successful working of the invention such as a retroreflective surface formed on the inside surface of an apertured sphere. Indeed, if one of the above mentioned retroreflectors, 5a or 5b is removed from the system, then a viewable image 19 will continue to be produced, but will be reduced in brightness by approximately half. Also, by removing one of the retroreflectors in the above example, it is possible to combine another image, real or virtual, with the apparent 3-D image 19, thus enabling the 3-D image to be overlaid over a background or foreground scene. An increase in brightness of the image 19 may be achieved by replacing the semi-reflective mirror 7 with a polarization splitting layer or a circularly dichroic beam splitter such as one or more layers of circularly dichroic cholesteric or smectic liquid crystals or liquid crystal polymers and optionally, if required, quarter wave retarders placed in front of the retroreflective walls. Transmission or reflection of right-hand circularly polarized or left-hand circularly polarized light respectively by the layer is achieved, the light being reversed in polarization upon being retroreflected (through the quarter wave retarder, if required,) and then respectively reflected and transmitted so that it recombines to give an unpolarized image having greater brightness than if the semi-reflective mirror 7 had been used.

Figure 5:
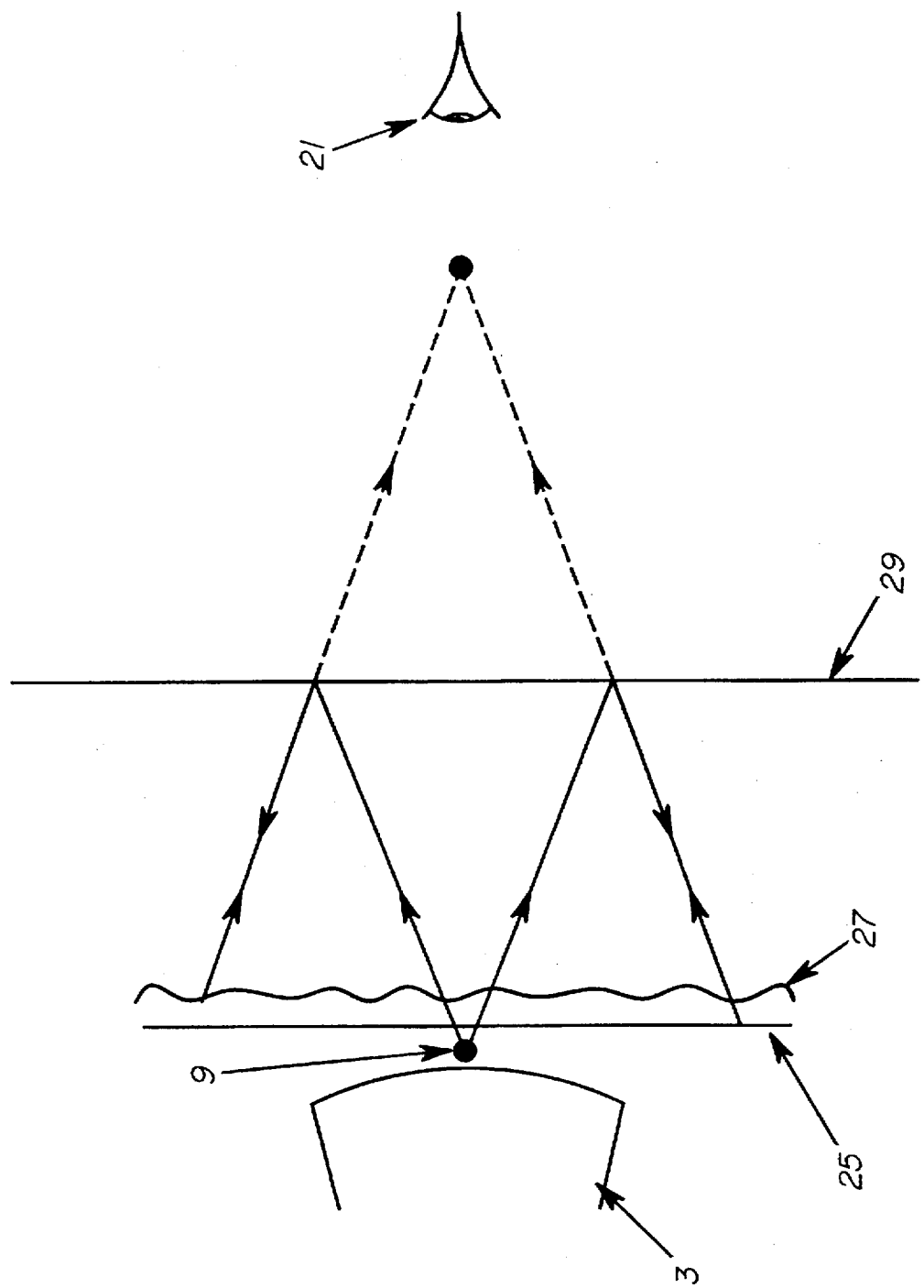
FIG. 5 illustrates an alternative arrangement to that of FIG. 4.

With reference now to FIG. 5, it will be seen that an apparent 3-D image suspended in space may be formed by an alternative arrangement to those detailed herebefore and which employs the properties of such polarization splitter.

Screen 3 is overlaid by a circular polarizer 25 such that light from a pixel 9 having passed through polarizer 25 is circular polarized in one sense, say, right hand circular polarized. The divergent right hand circularly polarized light then passes through a half-silvered retroreflector 27 and on to strike a circularly dichroic beamsplitter in the form of a cholesteric liquid crystal layer 29. Layer 29 has the optical property of transmitting light polarized in one circular sense, say left, and reflecting light of the other sense, right.

Hence, the right circularly polarized light which strikes layer 29 will be reflected as a divergent beam towards the half-silvered retroreflector 27. On striking retroreflector 27 a portion of the light will be reflected back along its original path but (as will be apparent to those skilled in the art). Consequently, the sense of circular polarization of the retroreflected light will have changed from right to left. Thus when the now left hand circularly polarized light impinges on layer 29 it will be transmitted and so from an apparent 3-D image for viewing at 21.

Figure 6:
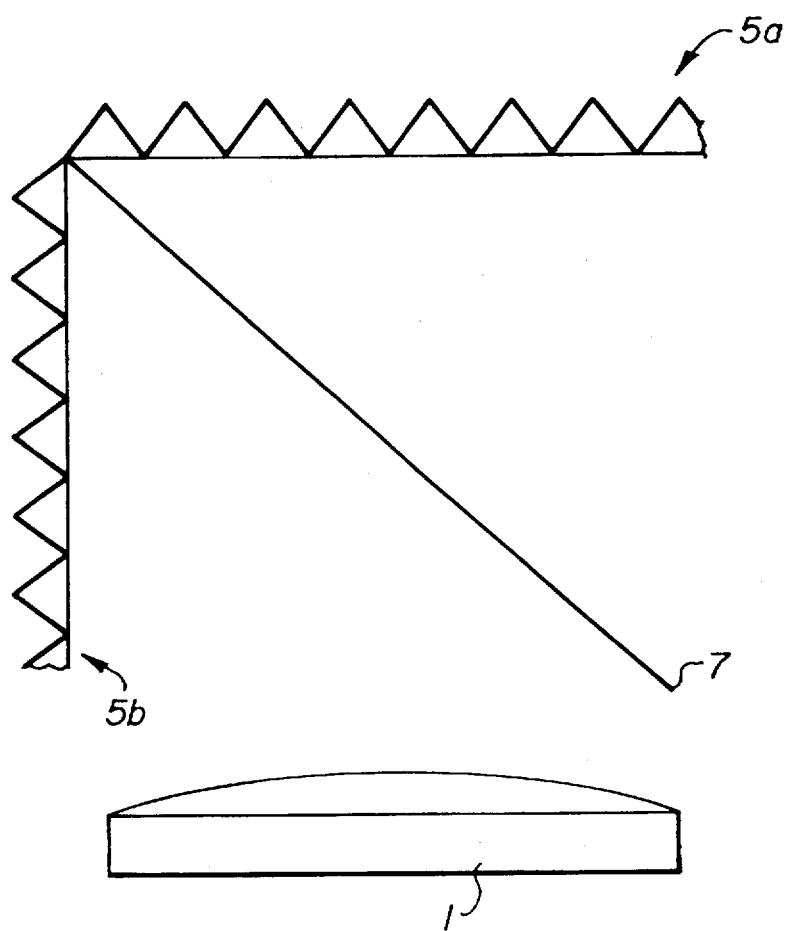
FIG. 6 illustrates an arrangement in which the corner-cube retroreflectors are illustrated.

FIG. 6 illustrates a similar arrangement in which retroreflectors 5a, 5b, reflect the light rays impinging thereon back along the respective original paths of the light rays, i.e., to the semi-reflective mirror 7. Retroreflectors 5a and 5b are made up of corner-cube retroreflectors in which each triangle of retroreflector 5a, 5b is a cross-section through a corner of a cube. Television set 1 is arranged as described above with respect to FIG. 2.

Similar embodiments are envisaged using a non-corner cube type retroreflector which separates orthogonal linearly polarized components of the incident light and may also, optionally if required, use quarter wave retarders.

It will be appreciated that if the distance between the screen 3 and beamsplitter 7 is increased, a corresponding increase in the distance between the beam splitter 7 and the suspended image 19 will ensue, in line with conventional optics. The observer 21 may interact with the image 19 or even walk right through it. It is envisaged that this effect will be of value in advertising displays or special effects. Furthermore, the sheets of retroreflectors may be made very large and used to cover the walls and ceiling of a room in order to bring the real image of a movie or video recording of a life-size artiste out into the room for perception as three dimensional, this image may then be approached and even walked through, or viewed through a lens, e.g. a magnifying glass.

The invention may equally well be employed to produce a 3-D image of a 3-D object, for example public display of precious jewellery in a shop window, with the real image brought through the glass and into the street for prospective customers to examine but not remove. Another example where the invention may be adopted is to create a real image, suspended in space, of one or more real lamps or light sources. It should be noted that a three dimensional object is turned inside out in the real image, thus a face produces a real image resembling a hollow mask.

Thus it will be apparent that a true apparent 3-D image may be created by having two of the described embodiments arranged in a "back-to-back" format, that is such that the output (apparent 3-D image) of one becomes the input (object) for the other.

It will be appreciated that other types of retroreflector may be incorporated into the present invention, such as the glass bead type as manufactured by the 3M company under the trade mark "Scotchlite".

Additionally, it is envisaged that other forms of retroreflector may equally well be employed within the present invention.

It will be further appreciated that the original object or image to be displayed is not limited to the examples given hereinbefore. Other suitable objects are computer generated pictures, visual display units, movie or cine pictures on a screen or a slide projection.

Thus the invention described hereinbefore provides an apparatus and method to produce an apparent 3-D image of an original scene based on the perception of depth cues present in the original scene, and by employing retroreflectors.

I claim:

1. Apparatus for displaying a real image of an object or original image, the real image being suspended in space, the apparatus comprising: at least one array of corner-cube retroreflectors and at least one circularly polarization selective beamsplitter, the beamsplitter directing light from the object or original image towards the at least one array of retroreflectors, and directing the light reflected from the array of retoreflectors to form said real image.

2. Apparatus according to claim 1 wherein the retroreflector is in the form of a material having an array of corner cubes formed as protrusions or depressions on a major surface of the material.

* * * * *